UNITED STATES PATENT OFFICE.

CHARLES JAQUET, OF KÖNIGSHOFEN, STRASBURG, GERMANY, ASSIGNOR TO SCHNEIDER, JAQUET & CIE., G. M. B. H., OF KÖNIGSHOFEN, STRASBURG, GERMANY.

PROCESS OF TREATING GRAIN, PULSE, AND THE LIKE.

1,041,629.      Specification of Letters Patent.      Patented Oct. 15, 1912.

No Drawing.      Application filed March 31, 1911. Serial No. 618,241.

*To all whom it may concern:*

Be it known that I, CHARLES JAQUET, a subject of the German Emperor, and residing at Königshofen, Strasburg, Alsace, German Empire, have invented certain new and useful Improvements in Processes of Treating Grain, Pulse, and the Like, of which the following is a specification.

My invention relates to a process of improving wheat and other grains, pulse and the like, and of keeping the same fresh.

In the ordinary treatment of grain, and especially wheat, immediately subsequent to the washing or wetting operation, the material, for the purpose of partially drying it, is aired and left to stand for a considerable time. Owing to the particles of water which have penetrated into the seeds, causing an increase in the number of bacteria, fermentation results. Such fermentation is greatly favored by the generation of heat which ensues, and, if the grain stands long, the fermentation is transmitted to the interior of the seeds, which results in so-called "balling" of the flour prepared from the same, that is to say, the formation of balls or lumps therein. On the other hand, experiments prove that this fermentation produces an increase in the percentage of hydrocarbons, which is doubtless due to certain ferments, etc., bringing about decomposition of the kernel of the seed in its outer layers and of the said particles of water. This improvement of the grain, however, as experience shows, only occurs if the said fermentation is interrupted at the right moment; or, should fermentation already have taken place previously, for any reason, if supplementary or over-fermentation is prevented during the treatment of the grain subsequent to the washing or wetting procedure.

It is this interruption or prevention of fermentation which constitutes the purpose of my present invention, and I attain my object by suitably moistening and airing the grain, pulse or the like, if necessary repeatedly. For this purpose immediately the material in question has been washed or wetted and aired, I again wash or wet it, and, if desired, pass an air current through it, or subject the material to other measures which hinder fermentation. Practice has proved that in this manner not only is the material improved in character, but the grain or the like, as well as the flour prepared therefrom, is actually preserved, both being rendered less sensitive to further influences of damp, etc. In this way the material in question, and the flour obtained from it, are far better capable of transport and storage than such treated according to prior methods.

Having thus described my invention, I declare that what I claim as new and desire to secure by Letters Patent of the United States, is—

1. The process of improving, and keeping fresh, grain, pulse and the like, consisting in wetting the same and submitting it to a current of air, and in thereupon immediately repeating the water treatment of the material in its entire state, substantially as described.

2. The process of improving, and keeping fresh, grain, pulse and the like, consisting in wetting the same and submitting it to a current of air, and in thereupon immediately repeating the water treatment of the material in its entire state, and checking fermentation, substantially as described.

3. The process of improving, and keeping fresh, grain, pulse and the like, consisting in wetting the same and submitting it to a current of air, and in thereupon immediately repeating the water treatment of the material in its entire state, and again passing a curernt of air through it, substantially as described.

In testimony whereof I affix my signature in presence of two witnesses.

CHARLES JAQUET.

Witnesses:
   ER. JAQUET,
   JOS. ROHMER.

---

Copies of this patent may be obtained for five cents each, by addressing the "Commissioner of Patents, Washington, D. C."